(12) United States Patent  
Elshishiny et al.

(10) Patent No.: US 8,984,485 B2  
(45) Date of Patent: Mar. 17, 2015

(54) ANALYSIS OF SOURCE CODE CHANGES

(71) Applicant: International Business Machines Corporation, Armonk, NY (US)

(72) Inventors: Hisham E. Elshishiny, Cairo (EG); Sherif Sabry, Cairo (EG); Ghada H. Selim, Giza (EG); Ossama Shokry, Giza (EG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/874,534

(22) Filed: May 1, 2013

(65) Prior Publication Data

US 2014/0331203 A1    Nov. 6, 2014

(51) Int. Cl.
G06F 9/44     (2006.01)
G06F 9/45     (2006.01)
G06F 11/36    (2006.01)

(52) U.S. Cl.
CPC ................................ *G06F 11/3676* (2013.01)
USPC .......................... 717/124; 717/133; 717/144

(58) Field of Classification Search
None
See application file for complete search history.

(56) References Cited

U.S. PATENT DOCUMENTS

| | | | |
|---|---|---|---|
| 7,624,385 B2* | 11/2009 | Waddington et al. | 717/143 |
| 8,079,018 B2 | 12/2011 | Huene et al. | |
| 8,117,598 B2* | 2/2012 | Johnson et al. | 717/124 |
| 8,453,126 B1* | 5/2013 | Ganelin | 717/144 |
| 8,516,458 B2* | 8/2013 | Stewart et al. | 717/144 |
| 8,683,449 B2* | 3/2014 | Singh et al. | 717/144 |
| 8,875,110 B2* | 10/2014 | Lee | 717/144 |
| 2005/0183074 A1* | 8/2005 | Alexander et al. | 717/144 |
| 2005/0183075 A1* | 8/2005 | Alexander et al. | 717/144 |
| 2006/0168565 A1 | 7/2006 | Gamma et al. | |
| 2009/0204939 A1 | 8/2009 | Lavrova | |
| 2011/0138368 A1* | 6/2011 | Krauss | 717/133 |
| 2011/0214106 A1* | 9/2011 | Qi et al. | 717/124 |
| 2012/0060144 A1* | 3/2012 | Novak et al. | 717/124 |
| 2012/0084756 A1* | 4/2012 | Subramanian et al. | 717/124 |
| 2012/0110557 A1* | 5/2012 | Singh et al. | 717/133 |
| 2013/0014093 A1* | 1/2013 | Lee | 717/144 |
| 2014/0040869 A1* | 2/2014 | Park et al. | 717/133 |
| 2014/0053135 A1* | 2/2014 | Bird et al. | 717/124 |
| 2014/0173564 A1* | 6/2014 | Crawford et al. | 717/124 |
| 2014/0196011 A1* | 7/2014 | Bostick et al. | 717/124 |
| 2014/0282405 A1* | 9/2014 | Chan et al. | 717/124 |
| 2014/0282406 A1* | 9/2014 | Narasimhan et al. | 717/124 |
| 2014/0282410 A1* | 9/2014 | Chan et al. | 717/124 |

OTHER PUBLICATIONS

Miryung Kim, "Analyzing and Inferring the Structure of Code Changes", 2008, University of Washington, 1-250; <http://users.ece.utexas.edu/~miryung/Publications/uw08-dissertation-mkim.pdf>.*

(Continued)

*Primary Examiner* — Thuy Dao
*Assistant Examiner* — Ben C Wang
(74) *Attorney, Agent, or Firm* — Noah A. Sharkan; David B. Woycechowsky

(57) ABSTRACT

Use of an Abstract Syntax Tree (AST) to select portions of source code when analyzing the affect of changes in that source code from one version to another. In this way, it is possible to better focus on how changes in the source code, especially changes which only impact limited portion(s) of the source code, affect code quality with respect to measures like code complexity, performance and so on.

20 Claims, 5 Drawing Sheets

(56) References Cited

OTHER PUBLICATIONS

Alejandro Asenjo, "Ratchet: A Prototype Change-Impact Analysis Tool with Dynamic Test Selection for C++ Code", May 2011, The University of Texas at Austin, pp. 1-64; <http://repositories.lib.utexas.edu/bitstream/handle/2152/ETD-UT-2011-5-3306/ASENJO-MASTERS-REPORT.pdf?sequence=1>.*

Neamtiu et al., "Understanding Source Code Evolution Using Abstract Syntax Tree Matching", 2005 ACM, MSR '05, May 17, 2005, Saint Louis, Missouri, pp. 1-5; <http://dl.acm.org/results.cfm?h=l&cfid=592669242&cftoken=41007869>.*

Li et al., "Specifying and Detecting Behavioral Changes in Source Code Using Abstract Syntax Tree Differencing", 2013 Springer-Verlag Berlin Heidelberg, May 28, 2012, ISCTCS 2012, CCIS 320, pp. 466-473; <http://link.springer.com/chapter/10.1007%2F978-3-642-35795-4_59#page-1>.*

Cui et al., "Code Comparison System based on Abstract Syntax Tree", 2010 IEEE, Oct. 26, 2010, IC-BNMT 2010, pp. 668-673; <http://ieeexplore.ieee.org/stamp/stamp.jsp?tp=&arnumber=5705174>.*

German et al., "Change Impact Graphs: Determining the Impact of Prior Code Changes", pp. 1-15, Mar. 16, 2009.

"Abstract syntax tree—Wikipedia, the free encyclopedia", Mar. 23, 2011, <http://en.wikipedia.org/w/index.php?title=Abstract_syntax_tree&oldid=420289082>.

"Understand Source Code Analysis & Metrics", Copyright 1996-2012 Scientific Toolworks, Inc., downloaded Feb. 10, 2013, <http://www.scitools.com/ucpp.html?id=e0bcb8a38c2595f29534a9bfeb410c8>.

* cited by examiner

US 8,984,485 B2

ANALYSIS OF SOURCE CODE CHANGES

FIELD OF THE INVENTION

The present invention relates generally to the field of software development, and more particularly to source code analysis.

BACKGROUND OF THE INVENTION

Software tools for analyzing source code are known. For example, there are software programs used as static analysis tools that: (i) maintain, measure and analyze critical and/or large code bases; (ii) provide metrics and graphs; (iii) perform dependency analysis; (iv) perform standards testing; (v) work with various programming languages, such as C, C++, Objective C, Java (note: the term(s) "Java" may be subject to trademark rights in various jurisdictions throughout the world and are used here only in reference to the products or services properly denominated by the marks to the extent that such trademark rights may exist), hypertext markup language (HTML), etc.; (vi) provide searching; and/or (vii) provide custom and/or canned reports.

An abstract syntax tree (AST) is a tree representation of the abstract syntactic structure of source code. The source code is written in a programming language. Each node of the tree representation represents a construct in the source code. The syntax is abstract because it does not represent every detail appearing in the real syntax. For example, grouping parentheses are implicit in the tree structure. An if-condition-then expression, in the source code, may be denoted, in the tree representation, by a single node with two branches. Abstract syntax trees are commonly used in program analysis and program transformation systems.

SUMMARY

According to an aspect of the present invention, there is a method for analyzing source code. The method includes the following steps (not necessarily in the following order): (i) receiving first and second versions of a set of source code; (ii) making an Abstract Syntax Tree (AST) for at least the second version; and (iii) determining a set of impacted code parent(s) of the AST for the second version based upon differences between the first and second versions of the set of source code. At least the determining step is performed by a computer.

DETAILED DESCRIPTION

Figure 1:
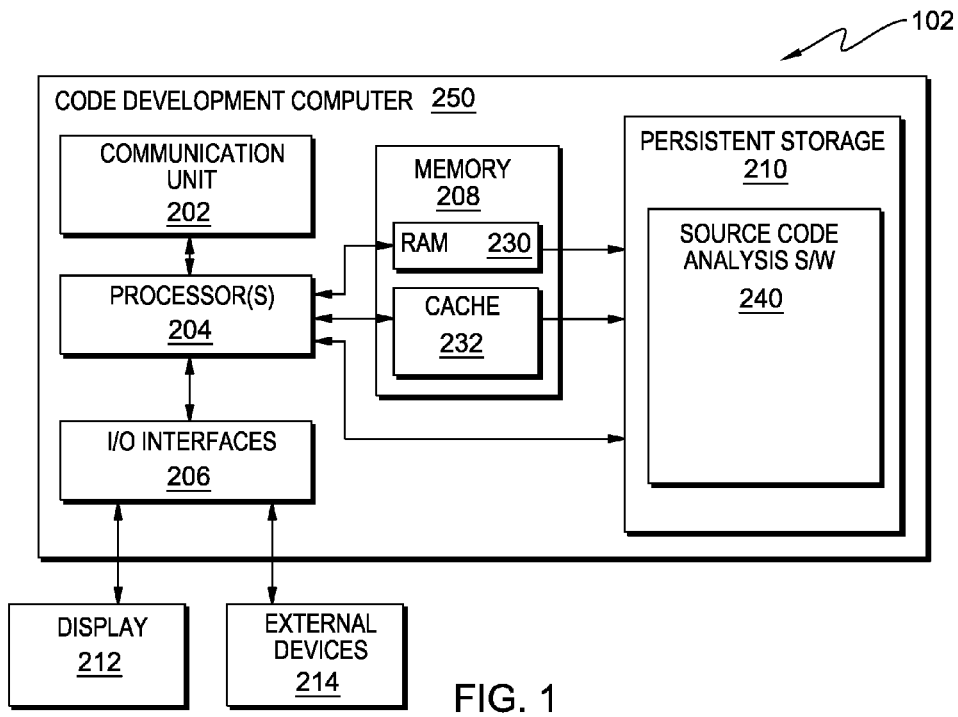
FIG. 1 is a schematic view of the first embodiment computer system.

This DETAILED DESCRIPTION section will be divided into the following sub-sections: (i) The Hardware and Software Environment; (ii) Operation of Embodiment(s) of the Present Invention; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

An exemplary hardware and software environment, in which a first embodiment of the present invention exists and/or operates, will now be discussed with reference to FIG. 1. FIG. 1 is a functional block diagram computer system 102, including: code development computer 250; communication unit 202; processor(s) (or processor set) 204; input/output (i/o) unit 206; memory device 208; persistent storage device 210; display device 212; external devices 214; random access memory (RAM) device 230; cache memory device 232; and source code analysis software 240. Several portions of data processing system 102 will now be discussed in the following paragraphs.

Code development computer 250 may be a laptop computer, tablet computer, netbook computer, personal computer (PC), a desktop computer, a personal digital assistant (PDA), a smart phone, or any programmable electronic device. Source code analysis s/w 240 is representative software, and is a collection of machine readable instructions and data that is used to create, manage and control certain software functions that will be discussed in detail below in the OPERATION OF EMBODIMENT(S) OF THE PRESENT INVENTION sub-section, below, of this DETAILED DESCRIPTION section.

It should be appreciated that computer system 102 is only an illustration of one implementation and does not imply any limitations with regard to the environments in which different embodiments may be implemented. Many modifications to the depicted environment may be made, especially with respect to current and anticipated future advances in cloud computing, distributed computing, smaller computing devices, network communications and the like.

As shown in FIG. 1, code development computer 250 is schematically shown as a block diagram with many double arrows. These double arrows (no separate reference numerals) represent a communications fabric, which provides communications among various components of data processing system 102. This communications fabric can be implemented with any architecture designed for passing data and/or control information between processors (such as, microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external devices 214 may be able to supply, some or all, memory for data processing system 102; and/or (ii) devices external to data processing system 102 may be able to provide memory for data processing system 102.

Source code analysis software 240 is stored in persistent storage 210 for access and/or execution by one or more of the respective computer processors 204, usually through one or more memories of memory 208. Persistent storage 210 is at least more persistent than a signal in transit is, but the persistent storage may, of course, be substantially less persistent than permanent storage. Software 240 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

Media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems (not shown) or devices (not shown) external to data processing system 102. Communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface(s) 206 allows for input and output of data with other devices that may be connected locally in data communication with code development computer 250. For example, I/O interface 206 provides a connection to external device 214. External devices 214 will typically include devices such as a keyboard, keypad, a touch screen, and/or some other suitable input device. External devices 214 can also include portable computer-readable storage media such as, for example, thumb drives, portable optical or magnetic disks, and memory cards. Software and data used to practice embodiments of the present invention, for example, software 240, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

II. Operation of Embodiment(s) of the Present Invention

Figure 2:
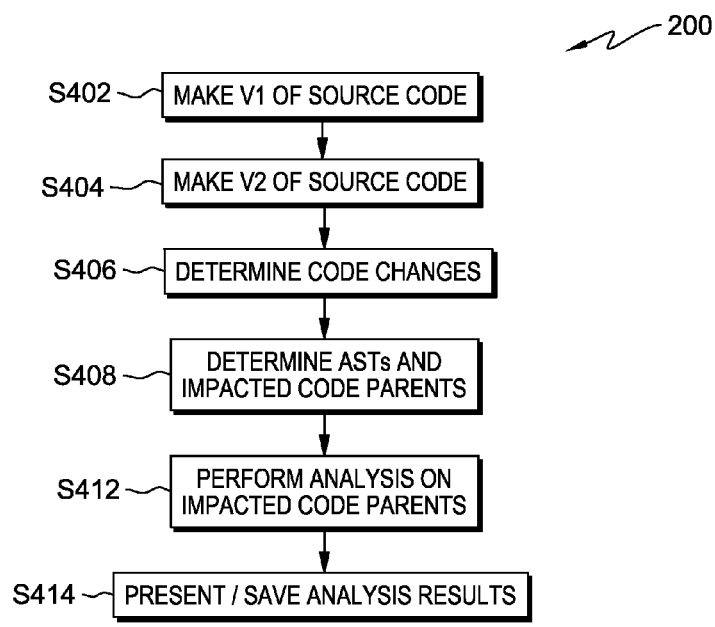
FIG. 2 is a flowchart showing a process according to the present invention.
Figure 3:
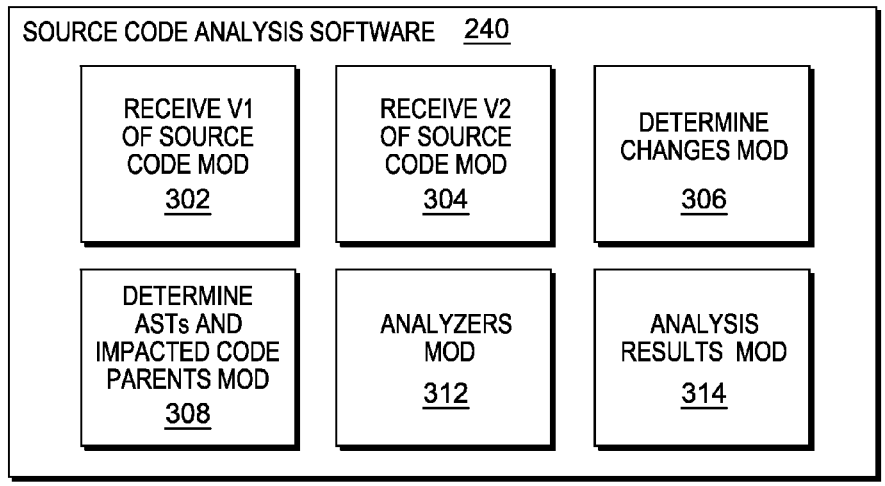
FIG. 3 is a schematic view of a portion of the first embodiment computer system.

As shown in FIG. 2, process 200 is a process for analyzing source code, with special attention to determining the impact of changes made to the source code as between successive versions of the source code. Sometimes these versions may be referred to as "old version" and "new version." Other times, these successive versions of the source code will be referred to as "current version" and "past version." Under the current/past nomenclature, it will be understood that a version of source code that is the "current" version at one given time may no longer be "current" at a later time after a successive version is created. Yet another way of referring to source code versions is as V1, V2, V3, etc. However, to the extent the claims recites "first version," "second version" and so on, it shall not be taken to imply that the first version is earlier in time than the second version (and so on), but rather, merely, that the first, second, etc. versions are different from each other. Process 200 will now be discussed with reference to FIGS. 1 to 6.

As shown in FIG. 2, processing begins at step S402 where a programmer (not shown) makes a first version (V1) of a set of source code. In this example, a programmer (not shown) writes this source code on code development computer 250 (see FIG. 1). Alternatively, some, or all, of the various versions of the source code could be: (i) written by an artificial intelligence entity; and/or (ii) written on computer(s) other than computer 250. Receive V1 source code module (or mod) 302 (see FIG. 3) of source code analysis software 240 (see FIGS. 1 and 3) receives this V1 version of the set of source code.

The first version, V1, for the source code now being discussed will now be listed as follows:

```
Math.java FILE
1          package com.test;
2
3          public class Math {
4              public int add (int x, int y) {
5                  return x + y;
```

```
6              }
7
8              public int subtract (int x, int y) {
9                  return x - y;
10             }
11         }
User.java FILE
1          package com.test;
2
3          public class User {
4
5              /**
6               * @param args
7               */
8              public static void main (String[ ] args) {
9                  int a = Integer.valueOf(args[1]).intValue( );
10                 int b = Integer.valueOf(args[2]).intValue( );
11                 Math math = new Math( );
12
13                 int c = math.add(a, b);
14
15                 System.out.println(a + " " + " + b +
" = " + c);
16             }
17         }
```

As shown in FIG. 2, processing proceeds to step S404 where the programmer makes a second version (V2) of a set of source code. The V2 version contains revisions with respect to the V1 version. Receive V2 source code mod 304 (see FIG. 3) receives this V2 version of the set of source code.

The second version, V2, for the source code now being discussed will now be listed as follows:

```
Math.java FILE
1          package com.test;
2
3          public class Math {
4              public int add (int x, int y) {
5                  System.out.println("In Math. add");
6                  return x + y;
7              }
8
9              public int subtract (int x, int y) {
10                 return x - y;
11             }
12         }
User.Java FILE
1          package com.test;
2
3          public class User {
4
5              /**
6               * @param args
7               */
8              public static void main (String[ ] args) {
9                  int a = Integer.valueOf(args[1]).intValue( );
10                 int b = Integer.valueOf(args[2]).intValue( );
11                 Math math = new Math( );
12
13                 int c = math.add(a, b);
14
15                 System.out.println(a + " " + " + b +
" = " + c);
16             }
17         }
```

As shown in FIG. 2, processing proceeds to step S406 where a determination of the changes in source code, as between V1 and V2, is made. More specifically, determine changes mod 306 (see FIG. 3) determines these changes. A review of the V1 and V2 versions of the source code listed above, for the example now under discussion, reveal that: (i) the file math.java is changed between versions V1 and V2 by the insertion of source line 5 into the V2 version of the math.java file; (ii) this change changes what the "math.add" function does when it is called (specifically, this change causes some predetermined text to be printed at each instance in which the math.add function is called) (iii) the text of the user.java file remains unchanged as between versions V1 and V2; and (iv) when the user.java file is executed different output will occur as between V1 and V2 because: (a) user.java calls the math.add function, and (b) the substance of the math.add function is changed as between V1 and V2.

As shown in FIG. 2, processing proceeds to step S408 where: (i) respective Abstract Syntax Trees (ASTs) are made for V1 and V2; and (ii) a determination of impacted code parents, as between the impacted ASTs, is made. More specifically, determine ASTs and impacted code parents mod 308 (see FIG. 3) determines AST and the identity of the "impacted code parents." Mod 308 includes the following sub-modules (which are not separately shown in FIG. 3): (i) parser; (ii) make AST; (iii) make source code tables; (iv) make source code changes tables; and (v) identify impacted code parents.

Figure 4:
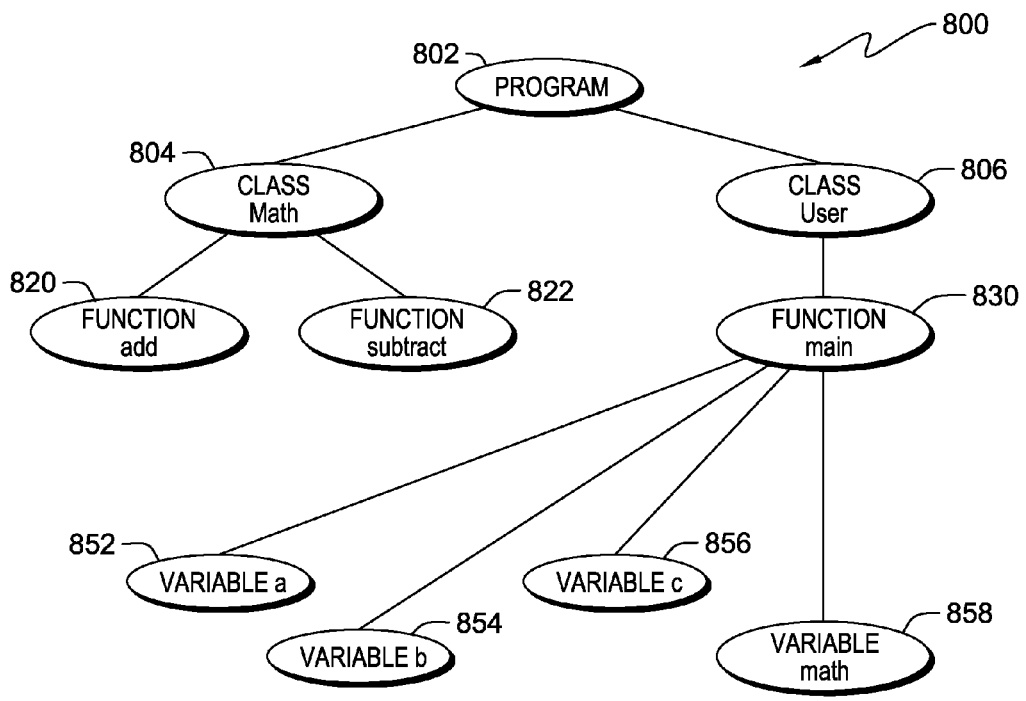
FIG. 4 is a graph diagram generated and used by the first embodiment computer system.

More specifically with respect to the making of the respective ASTs, mod 308 makes graphs of the V1 and V2 versions of the code. While the AST may not always remain the same from a first source code version to a second source code, in this example, both V1 and V2 will yield exactly the same AST, which is shown in FIG. 4 as AST 800, including: program level node 802; class level math node 804; class level user node 806; function level add node 820; function level subtract node 822; function level main node 830; variable a node 852; variable b node 854; variable c node 856; and variable level math node 858. AST 800 graph is designed to represent the source code in a hierarchical manner as shown by the lines connecting the various nodes in FIG. 4. In this example, the hierarchy has four levels: (i) program; (ii) class; (iii) function; and (iv) variable.

Figure 5:
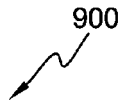
FIG. 5 is a table generated and used by the first embodiment computer system.
Figure 6:
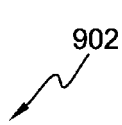
FIG. 6 is a table generated and used by the first embodiment computer system.

In order to determine impacted code parents, further processing is performed after AST(s) 800 are constructed. Specifically, a source code tables, including source-code-to-AST mappings, are determined for both versions V1 and V2. More specifically, for each version of the source code, the following source code tables are generated: (i) a functions level source code table; and (ii) a variable level source code table. Alternatively, a class level source code table may also be generated. Also, if an AST of some embodiment has additional levels, or different levels, then there will generally be source code tables for at least some of the lower level(s) of the AST hierarchy, at least in embodiments where source code tables are employed to determine "impacted code parents." Table 900 of FIG. 5 is the function level source code table for V1 of the source code set forth above. Note how each of the "occurrences" listed in table 900 links to a node in AST 800. This is source-code-to-AST mapping.

After the V1 and V2 source code tables are generated, a source code changes table (again including source-code-to-AST-mapping) is generated by mod 308. It is noted that, in this particular embodiment, the changes to the source code are known because this information was determined at step S406, discussed above. In other embodiments, the determination of the changes to the source code, as between V1 and V2, may not occur until after the respective ASTs, for V1 and V1, and/or the respective source code tables, for V1 and V2, have been generated.

In the current example under discussion, the change to the source code relates only to one "function," present in the V1 and V2 versions of the source code. Specifically, the only "function" that is changed, as between V1 and V2, is the math.add function, as mentioned above in connection with step S406. For this reason, source code changes table 902 is generated by mod 308 during step S408. This source code changes table identifies: (i) the portions of source code, as identified by file name and line numbers, impacted by the source code change; (ii) the way (for example, referential, definitional) in which the source code change impacts the source code portion; and (iii) the function level nodes of the hierarchical AST graph(s) that are impacted by the source code change.

It is possible for a node at the "variable level" of the AST to be impacted by a source code change. For example, this can happen when the type of the variable changes the node in the AST representing the variable.

Once all of the source code change tables are generated by mod 308, the "impacted code parents" are determined by: (i) collecting all of the "impacted nodes" identified in all the occurrences of all the source code change tables; and (ii) for each "impacted node," identifying the node one hierarchical level, in the AST, above the "impacted node," with that higher level node being the corresponding "impacted code parent." In the case of table 902 (FIG. 6) and AST 800 (FIG. 4): (i) the "impacted nodes" are function level add node 820 and function level main node 830; and (ii) the "impacted code parents" are class level node math 804 and class level node user 806. In this case, all classes of the program are impacted, which means that this particular example is not particularly useful for showing how the present invention can save analysis time and/or computing resources, as will be discussed below. However, in other examples, not every class level node of the AST hierarchy will be an "impacted code parent," and this identification of the select portions of the AST residing under "impacted code parents" can be leveraged into more efficient program testing, debugging, etc.

As shown in FIG. 2, processing proceeds to step S412 where the impacted code parents are analyzed. More specifically, analyzers mod 312 includes one or more analyzers for respectively analyzing one or more source code characteristics with respect to the impacted code parents, such as: (i) complexity; (ii) performance; (iii) memory footprint; and/or (iv) functionality. Other types of analysis, and associated analyzers, are possible, such as translation verification testing (TVT) analyzers. Some analyzers are test-case-based analyzers that run test cases. For example, the following types of analyzers are usually test-case-based: (i) performance; (ii) memory footprint; (iii) functionality; and (iv) translation verification testing (TVT) analyzers. Other analyzers generally do not use test cases and these are herein referred to as non-test-case-based analyzers. For example, complexity analyzers are non-test-case-based analyzers.

The analyzers used in the present invention may be pre-existing analyzers, with pre-existing test cases, which are currently conventional. However, some embodiments of the present invention cause the analyzer(s) to run only on portions of the source code corresponding to the "impacted code parents" identified at step S408. This means that the analyzers do not need to necessarily be run over the entire body of a new version (for example, V2) of the source code. It also means that a human computer expert does not need to attempt to identify portions of a new version of the source code upon which the analyzer(s) should be run.

As shown in FIG. 2, processing proceeds to step S414 where the analysis results, previously obtained in step S412, are: (i) presented locally to the user; (ii) stored as data (for example, in a relatively permanent storage device included in external device(s) 214 of code development computer 250 shown in FIG. 1); and/or (iii) communicated to remote computers and/or third parties (for example, communicated by email by communication(s) unit 202 of code development computer 250 shown in FIG. 1). More specifically, analysis results mod 314 performs this presentation of results, storage of results, and/or communication of results.

The flowchart and block diagrams in the foregoing Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

III. Further Comments and/or Embodiment(s)

Figure 7:
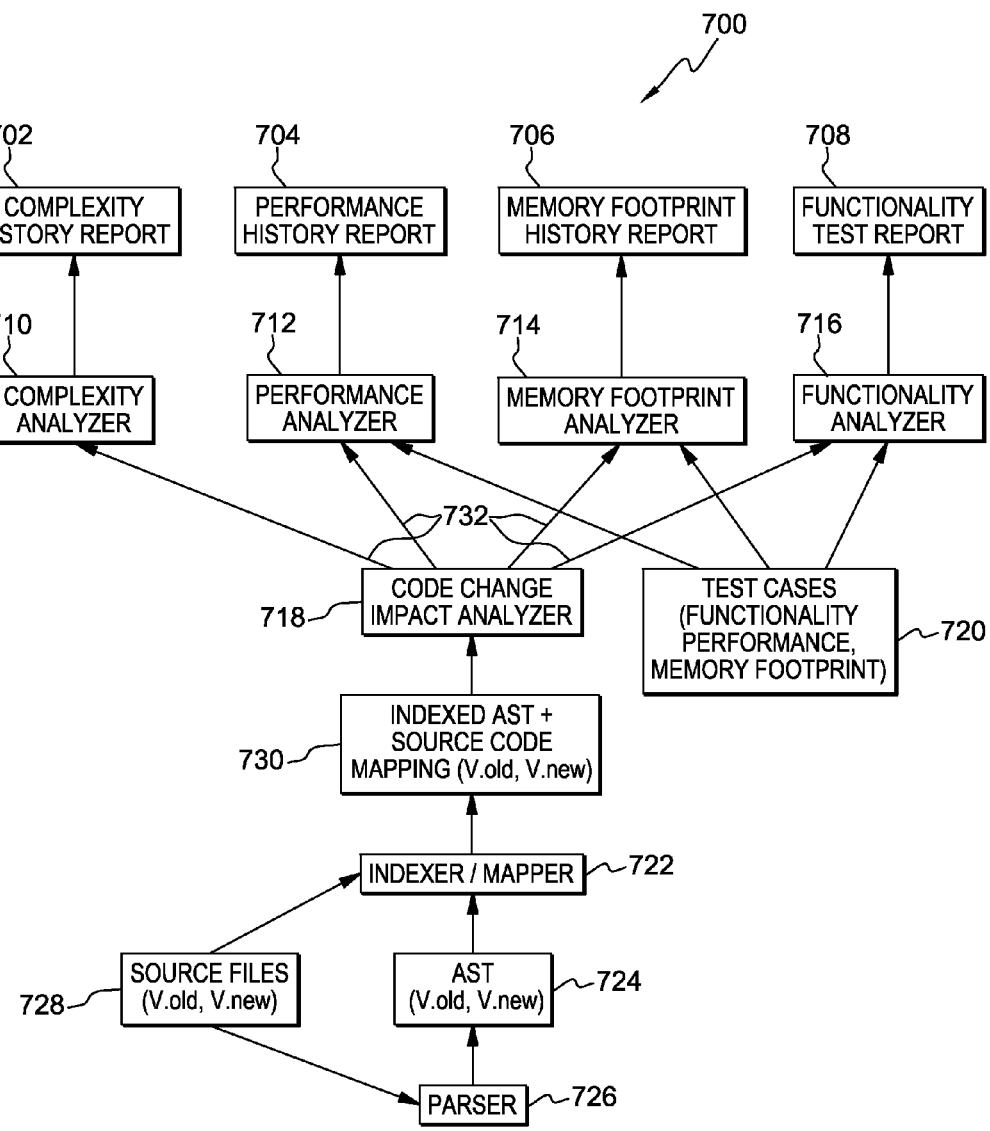
FIG. 7 is an interface block diagram relating to a second embodiment of a computer system according to the present invention.

As shown in FIG. 7, system (also called "embodiment") 700 includes: complexity history report 702; performance history report 704; memory footprint history report 706; functionality test report 708; complexity analyzer 710; performance analyzer 712; memory footprint analyzer 714; functionality analyzer 716; code change impact analyzer 718; test cases (functionality, performance, memory footprint) 720; indexer/mapper 722; ast (v.old (or old version), v.new (or new version)) 724; parser 726; sourcefiles (v.old, v.new) 728; indexed ast+sourcecode mapping (v.old, v.new) 730; and impacted code parents 732. Schematic diagram of system 700 illustrates an embodiment of the present invention and the interaction among its constituent blocks. An overview of embodiment 700 will now be discussed in conjunction with FIGS. 7 through 10.

Some embodiments of the present invention provide a system and method that enables the programmer to automatically detect the impact of changes made to the source code. Prior to synchronizing with the code repository, through a source control mechanism, the impact of the changes is assessed with respect to functionality, performance, memory footprint, and code complexity.

System 700 uses the code AST (Abstract Syntax Tree) to compare the new version of the code to the old version of the code. The code changes are identified. The AST is traversed to determine impacted code parents 732 (for example, classes). As shown in FIG. 7, impacted code parents 732 are fed to multiple impact analyzers 710, 712, 714, and 716 that will analyze the code changes and present the end user with historical analysis of the code changes impact in the form of reports 702, 704, 706, and 708. The impact analysis allows for systematic tracking and analysis of the following: (i) impact of code changes on functionality (see functionality test report 708); (ii) impact of code changes on memory footprint (see memory footprint history report 706); (iii) impact of code changes on performance (see performance history report 704); and (iv) impact of code changes on code complexity (see complexity history report 702). Additionally, a historical analysis of the previous reports can be performed with respect to the different versions of the code. The end user can select a set of code artifacts (for example, class+function) in order to limit the impact analysis to this selected set of code artifacts.

Parser 726 (see FIG. 7) is a language specific parser that takes source code in a set of source files 728 as an input and produces AST 724 for the code as an output.

As further shown in FIG. 7, indexer/mapper 722 creates an indexed tabular representation of the source code, which is called indexed ast+sourcecode mapping (v.old, v.new) 730. Indexed ast+sourcecode mapping (v.old, v.new) 730 includes a table for variables where the variable name is the key for the index. Each entry in the table contains a pointer to an occurrence of the variable in AST along with a pointer to the relevant occurrence of the variable in the source code.

Code change impact analyzer 718 (see FIG. 7) makes use of indexed ast+sourcecode mapping (v.old, v.new) 730 in order to identify impacted code parents 732. Impacted code parents 732 is the list of parts of the code that are impacted by the code change and hence require validation and/or testing for consistency.

Functionality analyzer 716 consults a list of functionality test cases within test cases (functionality, performance, memory footprint) 720 (see FIG. 7), which are provided by code developers. Functionality analyzer 716 identifies the test cases that are impacted by changes in the code and runs them. In case of failure, the part of code change is highlighted to the user (not shown), of system 700, as a potential cause of the failure.

Performance analyzer 712 consults a list of performance test cases within test cases (functionality, performance, memory footprint) 720 (see FIG. 7) which are provided by code developers. The performance analyzer 712 identifies performance test cases that are impacted by changes in the code and runs them. Performance history report 704 is generated and includes profiling results of impacted parts of the code. For each version of the code, the profiling results are tracked so that a historical analysis of performance versus code version is provided.

As shown in FIG. 7, complexity analyzer 710 analyzes code changes and provides the end user with a report of code complexity impact in the form of complexity history report 702. Specifically, in complexity history report 702, three things are analyzed: (i) change in number of statements; (ii) change in selection (if statements and the likes, also nested selection); and (iii) changes in loops (for loops and the likes, also nested loops).

Memory footprint analyzer 714 consults a list of memory footprint test cases within test cases (functionality, performance, memory footprint) 720 (see FIG. 7) which are provided by code developers. Memory footprint analyzer 714 identifies the memory footprint test cases 720 that are impacted by changes in the code and runs them. Memory footprint analyzer 714 generates memory footprint history report 706, which includes memory footprint results of impacted parts of the code. For each version of the code, the memory footprint results are tracked, so that a historical analysis of memory footprint versus code version is provided.

A method embodiment of the present invention, including first to tenth steps, will now be discussed in the following paragraphs.

The first step will now be discussed. The new version (v.new) and the previous version (v.old) of code (shown on FIG. 7 as sourcefiles (v.old, v.new) 728) are fed to parser 726 in order to generate two ASTs, AST.new and AST.old (shown in FIG. 7 as AST (v.old, v.new) 724).

The second step will now be discussed. AST (v.old, v.new) 724 and sourcefiles (v.old, v.new) 728 are fed to indexer/mapper 722.

The third step will now be discussed. Indexer/mapper 722: (i) takes the ASTs and the source files as inputs; (ii) creates indexed ast+sourcecode mapping (v.old portion) 730 for both the old version of the code; and (iii) creates indexed ast+sourcecode mapping (v.new portion) 730 for both the new version of the code. More specifically, ast+sourcecode (v.old, v.new) is created in accordance with the following three principles that will be discussed in the following three paragraphs.

The first principle used in creating ast+sourcecode mappings in the third step will now be discussed. An index is created for variables. The key, under this first principle, is the variable name. The value consists of multiple entries for all occurrences of this variable in the code. Each entry contains the following: (i) type of entry, whether it is variable definition or variable reference; (ii) pointer to the entry in the AST; and (iii) pointer to the entry in the source code (file name+line number).

The second principle used in creating ast+sourcecode mappings in the third step will now be discussed. An index is created for functions. The key, under this second principle, is the function name. The value consists of multiple entries for all occurrences of this function in the code. Each entry contains the following: (i) type of entry, whether it is function definition or function reference; (ii) pointer to the entry in the AST; and (iii) pointer to the entry in the source code (file name+line number).

The third principle used in creating ast+sourcecode mappings in the third step will now be discussed. An index is created for impacted code parents 732. This index includes classes, modules, and/or another encapsulation paradigm (depending on the programming language). The key, under this third principle, is the class name. The value consists of multiple entries for all occurrences of this class in the code. Each entry contains the following: (i) type of entry, whether it is class definition or class reference; (ii) pointer to the entry in the AST; and (iii) pointer to the entry in the source code (file name+line number).

The fourth step will now be discussed. As shown in FIG. 7, indexed ast+sourcecode mapping (v.old, v.new) 730 for both the old version and the new version of the code are fed to code change impact analyzer 718.

The fifth step will now be discussed. As shown in FIG. 7, code change impact analyzer 718 searches for the code changes in indexed ast+sourcecode mapping (v.old, v.new) 730 in order to produce list of impacted code parents 732. More specifically, the list of impacted code parents is produced by performance of the following four sub-steps: (i) the two versions for the code (old and new) are compared in order to generate a list of code changes; (ii) for each code artifact in the code changes (for example, each variable), the relevant index (for example, the variables index) is searched to retrieve occurrences of the code artifact (the occurrences of the code artifact are either the sole definition of the artifact or the reference(s) to the artifact may be included); (iii) for each code artifact identified in the code changes, the relevant AST node is traversed upward to retrieve the top most parent (that is, the class); and (iv) the parent classes collected in the previous sub-step are put in the form of a list of impacted code parents 732, which becomes the outcome of code change impact analyzer 718.

The sixth step will now be discussed. As shown in FIG. 7, functionality analyzer 716 performs the following sub-steps: (i) receiving impacted code parents 732 from code change analyzer 718; (ii) receiving the functionality test cases of block 720; (iii) maintaining a mapping between each impacted code parent 732 (for example, a class) and the corresponding functionality test case from block 720; (iv) running the functionality test cases; and (v) generating and presenting a functionality test report (also called historical functionality test report) 708 to the end user. The historical functionality test report shows which tests passed and which tests failed for each version of the class. In case of failure, the code change that potentially caused the failure is presented to the end user in the historical functionality test report.

Figure 8:
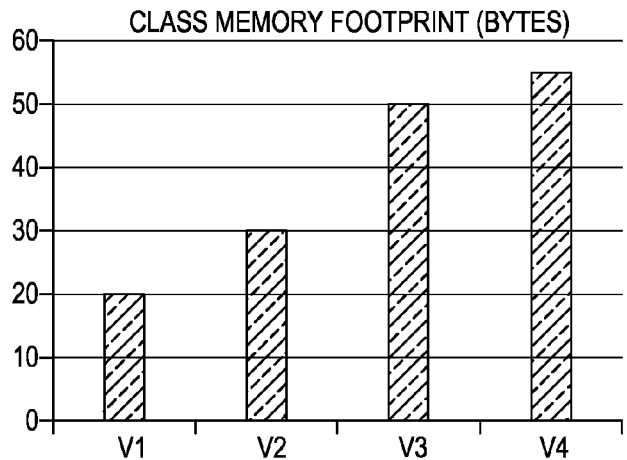
FIG. 8 is an example of a memory footprint histogram generated and printed by the second embodiment computer system.

The seventh step will now be discussed. Memory footprint analyzer 714 (see FIG. 7) performs the following sub-steps: (i) receiving impacted code parents from code change impact analyzer 718; (ii) receiving the memory footprint test cases of block 720; (iii) maintaining a mapping between each impacted code parent 732 (for example, a class) and the corresponding memory footprint test case received from block 720; (iv) running the memory test cases; (v) generating a report of the memory footprint for the classes; (vi) keeping track of the mapping between each version of the code and the corresponding report of the memory footprint; (vii) generating and presenting a historical analysis of the code (that is, memory footprint history report 706) to the user. The user can select a class and be presented with a graph showing memory footprint of the class as it changes relative to each version of the code. As shown in FIG. 8, an example memory footprint history report 706 shows class memory footprint (in bytes) for four versions of the source code V1 to V4. In this example, the following classes may be selected: (i) employee; (ii) manager; or (iii) company connection.

Figure 10:
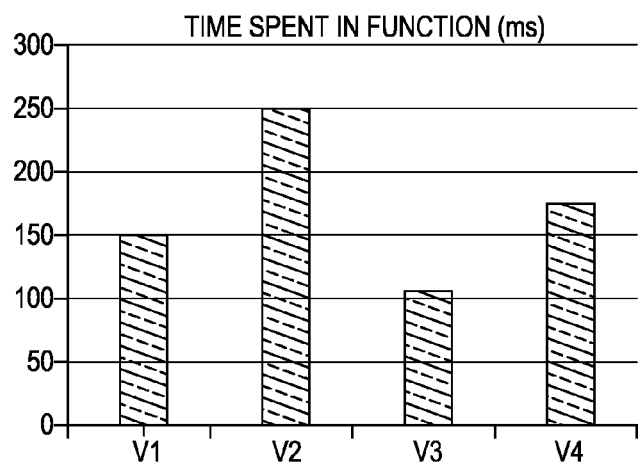
FIG. 10 is an example of a performance history report histogram generated and printed by the second embodiment computer system.

The eighth step will now be discussed. Performance analyzer 712 (see FIG. 7) performs the following sub-steps: (i) receiving impacted code parents 732 from code change impact analyzer 718; (ii) receiving performance test cases from block 720; (iii) maintaining a mapping between each impacted code parent 732 (for example, a class) and the corresponding performance test case; (iv) running the performance test cases; (v) generating a performance profiling report for the functions of the classes; (vi) keeping track of the mapping between each version of the code and the corresponding report; and (vii) generating and presenting to the user historical analysis of the code in the form of performance history report 704 (see FIGS. 7 and 10). As shown in FIG. 10, report 704 shows time spent in function (in milliseconds (ms)) for each version of the code V1 to V4. The user can select a class for report 704 (some example classes are: employee, manager and company connection). The user can also select a function in that class for report 704 (some example functions are manager( ), setName( ), and computeSalary( )).

Figure 9:
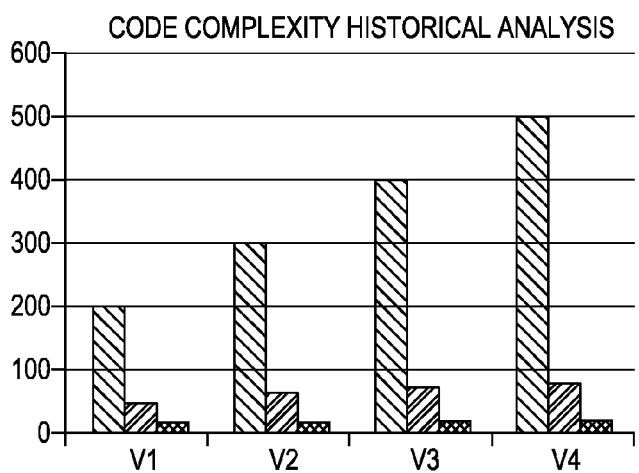
FIG. 9 is an example of a code complexity histogram generated and printed by the second embodiment computer system.

The ninth step will now be discussed. Complexity analyzer 710 (see FIG. 7) performs the following sub-steps: (i) receiving impacted code parents from code change impact analyzer 718; (ii) producing a code complexity report for each class in impacted code parents 732; (iii) keeping track of the mapping between each version of the code and the corresponding code complexity report; and (iv) presenting a historical analysis of the code (that is, complexity history report 702) to the user. In sub-step (ii), the code complexity report includes the following: (a) all code statements are counted; (b) all selection statements (for example, if statements) are counted; and (c) all loops (for example, for loops) are counted. In sub-step (iv), the user can select a class (for example, employee, manager or company connection) and be presented with a graph showing code complexity of the class as it changes relative to each version of the code. For example, FIG. 9 shows complexity history report 702 which includes a set of bars for every version of the code V1 to V4. Each set of bars includes the following bars from left to right: (i) total number of statements; (ii) number of selection statements; and (iii) number of loops.

The tenth step will now be discussed. In the tenth step, the user is presented with a consolidated report for each of the impacted code parents 732 (for example, classes) in accordance with the following two principles. The tenth step includes the following two sub-steps: (i) the user selects a class; and (ii) a consolidated report for the class is presented to the user. In sub-step (ii), the consolidated report includes the following information: (a) a historical functionality testing report, which shows which tests passed and which tests failed for each version of the class; (b) a graph showing memory footprint of the class as it changes relative to each version of the code (see report 706 of FIG. 8); and (c) a graph showing code complexity of the class as it changes relative to each version of the code (see report 702 of FIG. 9).

IV. Definitions present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

embodiment: see definition of "present invention" above—similar cautions apply to the term "embodiment."

and/or: non-exclusive or; for example, A and/or B means that: (i) A is true and B is false; or (ii) A is false and B is true; or (iii) A and B are both true.

user: includes, but is not necessarily limited to, the following: (i) a single individual human; (ii) an artificial intelligence entity with sufficient intelligence to act as a user; and/or (iii) a group of related users.

What is claimed is:

1. A method for analyzing source code, the method comprising:
   receiving first and second versions of source code;
   making an Abstract Syntax Tree (AST) for at least the second version;
   determining, by one or more computer processors, an impacted code parent of the AST for at least the second version based upon differences between code artifacts in the first and second versions of the source code; and
   generating an indexed table representing the impacted code parent of the AST for at least the second version, wherein the table is indexed based at least on the code artifacts in the first and second versions of the source code, and the table includes a type of each code artifact, pointers to the code artifacts in the AST, and pointers to the location of the code artifacts in the second version of the source code.

2. The method of claim 1, wherein the location of the code artifacts in the second version of the source code comprises line numbers of the second version of the source code.

3. The method of claim 1, wherein making the AST for at least the second version uses a source code parser to make the AST.

4. The method of claim 1, the method further comprising:
   analyzing source code exclusively on portions of the second version defined by a scope of the impacted code parent.

5. The method of claim 4, the method further comprising:
   responsive to analyzing the source code, creating a report reflecting results of analyzing the source code.

6. The method of claim 4, the method further comprising:
   selecting test cases based, at least in part, upon the impacted code parent;
   wherein:
   analyzing the source code exclusively on the portions of the second version defined by the scope of the impacted code parent comprises running the selected test cases.

7. The method of claim 1, further comprising:
   generating, by one or more computer processors, a complexity report for the impacted code parent comprising at least one of a number of source code statements included, a number of selection statements included, and a number of loops included.

8. A computer program product for analyzing source code, the computer program product comprising software stored on a software storage memory, the software comprising:
   first program instructions programmed to receive first and second versions of source code;
   second program instruction programmed to make an Abstract Syntax Tree (AST) for the second version;
   third program instructions programmed to determine impacted code parent of the AST for the second version based upon differences in code artifacts between the first and second versions of source code; and
   fourth program instructions programmed to generate an indexed table representing the impacted code parent of the AST for at least the second version of the source code, wherein the table is indexed based at least on the code artifacts in the first and second versions of the source code, and the table includes a type of each code artifact, pointers to the code artifacts in the AST, and pointers to the location of the code artifacts in the second version of the source code.

9. The product of claim 8, wherein the location of the code artifacts in the second version of the source code comprises line numbers of the second version of the source code.

10. The product of claim 8, wherein the second program instructions use a source code parser to make the AST for at least the second version.

11. The product of claim 8, wherein the software further comprises:
    fifth program instructions programmed to analyze source code exclusively on portions of the second version defined by a scope of the impacted code parent.

12. The product of claim 11, wherein the software further comprises:
    sixth program instructions programmed to create a report, reflecting results of analyzing the source code.

13. The product of claim 11, wherein the software further comprises:
    sixth program instructions programmed to select test cases based, at least in part, upon the impacted code parent;
    wherein:
    the fifth program instructions programmed to analyze source code exclusively on portions of the second version defined by a scope of the impacted code parent comprises running the selected test cases.

14. The product of claim 8, wherein the software further comprises:

fifth program instructions to generate a complexity report for the impacted code parent comprising at least one of a number of source code statements included, a number of selection statements included, and a number of loops included.

15. A computer system for analyzing source code, the computer system comprising:

a processor set; and a software storage memory;

wherein:

the processor set is structured and/or connected in data communication to execute machine readable instructions stored in the software storage memory; and the machine readable instructions comprises:

first program instructions programmed to receive first and second versions of source code;

second program instruction programmed to make an Abstract Syntax Tree (AST) for at least the second version; and third program instructions programmed to determine an impacted code parent of the AST for at least the second version based upon differences between code artifacts in the first and second versions of the source code; and fourth program instructions programmed to generate an indexed table representing the impacted code parent of the AST for at least the second version of the source code, wherein the table is indexed based at least on the code artifacts in the first and second versions of the source code, and the table includes a type of each code artifact, pointers to the code artifacts in the AST, and pointers to the location of the code artifacts in the second version of the source code.

16. The system of claim 15, wherein the location of the code artifacts in the second version of the source code comprises line numbers of the second version of the source code.

17. The system of claim 15, wherein the machine readable instructions further comprise:

fifth program instructions programmed to analyze source code exclusively on portions of the second version defined by a scope of the impacted code parent.

18. The system of claim 17, wherein the machine readable instructions further comprise:

sixth program instructions programmed to create a report, in human understandable form and format, reflecting results of analysis performed at the analyzing step.

19. The system of claim 17, wherein the machine readable instructions further comprise:

sixth program instructions programmed to select test cases based, at least in part, upon the impacted code parent;

wherein:

the fifth program instructions programmed to analyze source code exclusively on portions of the second version defined by a scope of the impacted code parent comprises running the selected test cases.

20. The system of claim 15, wherein the machine readable instructions further comprise:

fifth program instructions to generate a complexity report for the impacted code parent comprising at least one of a number of source code statements included, a number of selection statements included, and a number of loops included.

* * * * *